Dec. 9, 1952    M. L. GARDNER    2,620,713
TIME DELAY SWITCH MECHANISM FOR
CAMERA FLASH SYNCHRONIZERS
Filed May 19, 1950    2 SHEETS—SHEET 1
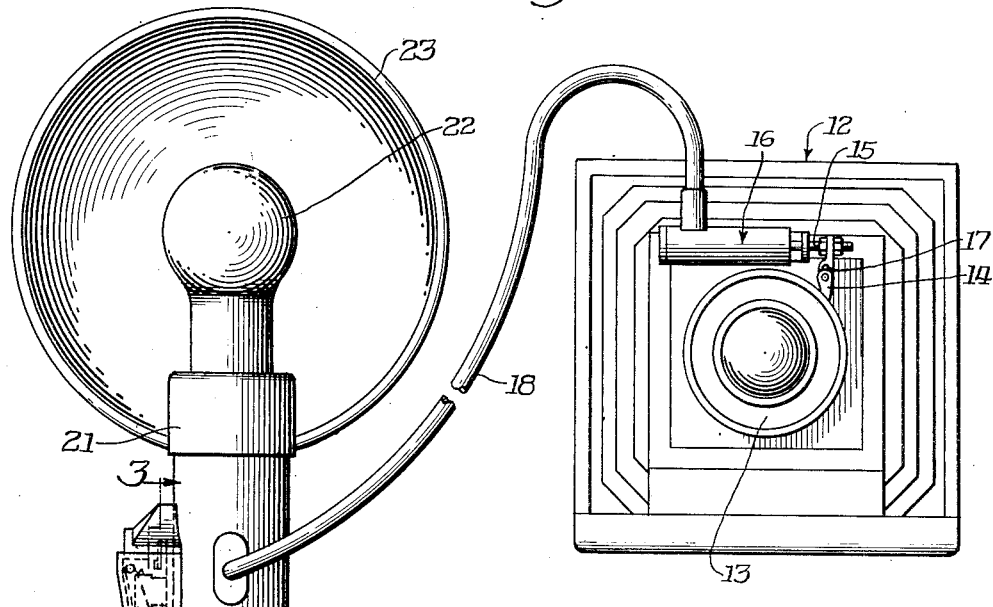
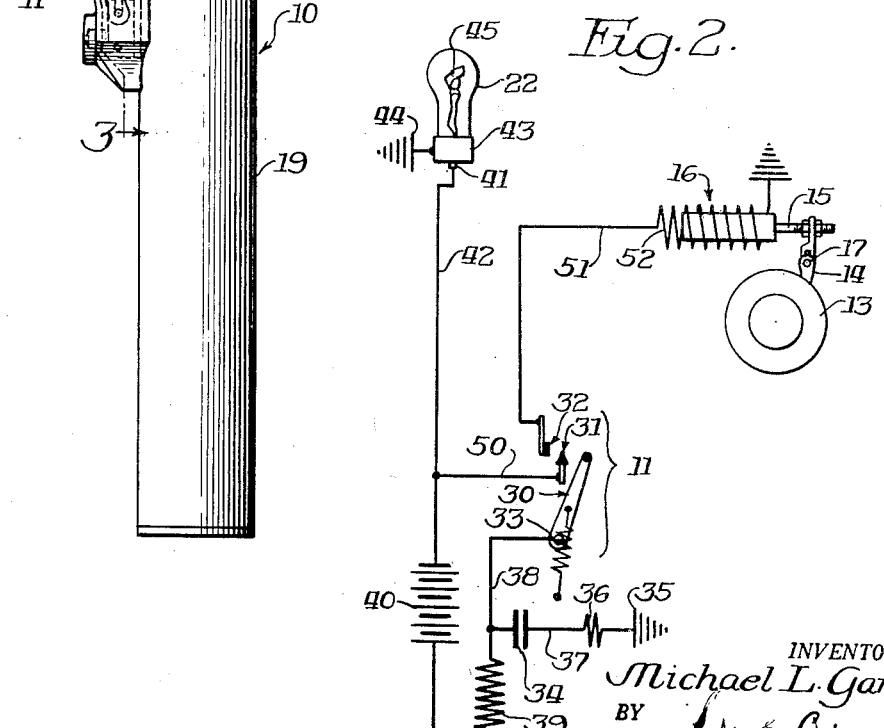
INVENTOR.
Michael L. Gardner
BY
Attys

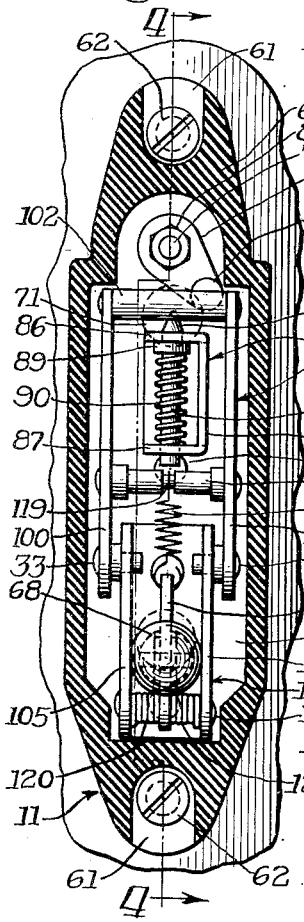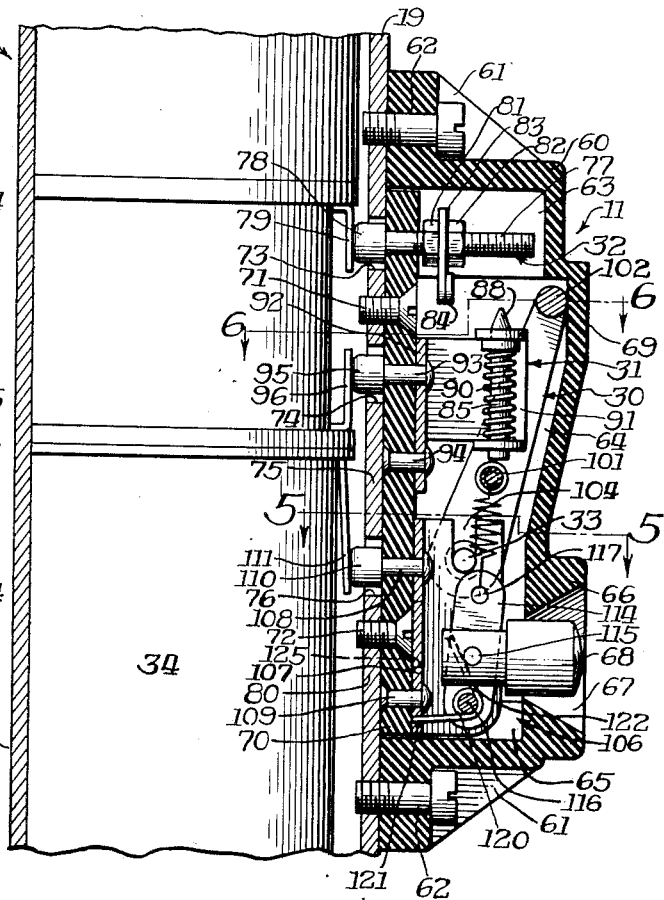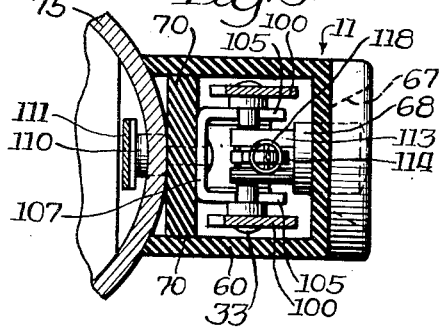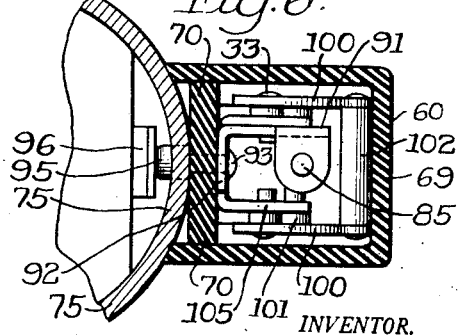

Patented Dec. 9, 1952

2,620,713

UNITED STATES PATENT OFFICE 2,620,713

TIME DELAY SWITCH MECHANISM FOR CAMERA FLASH SYNCHRONIZERS

Michael L. Gardner, Berwyn, Ill., assignor to Busch Precision Camera Corporation, Chicago, Ill., a corporation of Illinois Application May 19, 1950, Serial No. 162,973

4 Claims. (Cl. 95—11.5)

This invention relates to a time delay switch mechanism especially for use in connection with photographic equipment.

In flash photography a high brilliance light of short duration is produced by some means such as for example a photo-flash lamp, and when the brilliance of the flash is at its approximate peak, the shutter of a camera is uncovered and the sensitive film is exposed. The conventional method of accomplishing these functions employs a battery which is directly connected through appropriate switching means to the flash lamp and the solenoid operating the shutter. Variations of this scheme are common, but all have the same basic disadvantages and problems. The principal disadvantages rest in the necessity of using dry cells, which require constant changing in order to assure positive action. Variations in current and voltage caused by age, and other conditions, may prevent correct exposures.

Such disadvantages have given rise to a method of flashing such lamps which utilizes a capacitor as a storage repository for a charge of current, and setting off the lamp from the charge remaining on the capacitor. By means of this method, many of the disadvantages of the direct connected flashing method have been eliminated.

In the direct connected method, the shutter and its solenoid require synchronization in order to assure that the peak of illumination will be reached when the shutter is opened. Many methods of accomplishing this have been devised, most of which utilize some adjustable lost-motion connections. These of course are unsatisfactory.

In the battery-capacitor method, a part of the charge of the battery is released to the lamp, and the residual charge used to operate the shutter solenoid. The principal object of this invention is to provide a distributing switch mechanism in which the time delay between the partial discharge of the condenser and the second residuary discharge of the condenser accurately can be predetermined.

A further object of the invention is to provide a simple switching mechanism in which the speed at which the switch is manually operated, or the pressure used by the operator will in no way affect the speed of movement of the moving contact of the switch, so that the time delay between contacts will be constant.

Many other objects of the invention lie in the provision of a switching mechanism having a novel construction and having compactness, reliability, and simplicity in construction as well as dependability in operation.

Certain additional objects will appear as the description of my time delay switch mechanism proceeds, relating not only to the details of construction and arrangement of parts, but as well to novel and improved combinations for accomplishing the purposes for which the same is intended. As to those features which are charactertic of my invention, same have been set forth with particularity in the claims appended hereto. My invention itself, however, both as to its organization and the manner of construction, together with additional objects and advantages thereof, may best be understood by reference to the following description of a preferred embodiment, taken in connection with the accompanying drawings in which:

Fig. 1 is a front elevational view showing my switch mechanism associated with a flash gun and camera.

Fig. 2 is a schematic electrical diagram of the circuit in which my switch mechanism is used.

Fig. 3 is a sectional view taken through my switch mechanism along the line 3—3 of Fig. 1 and in the indicated direction.

Fig. 4 is a sectional view taken through the switch and the flash gun along the line 4—4 of Fig. 3 and in the indicated direction.

Figs. 5 and 6 are sectional views taken through the switch mechanism along the lines 5—5 and 6—6, respectively, of Fig. 4 and in the indicated direction.

Referring now to the drawings, in Fig. 1 there is illustrated the arrangement in connection with which my new switch mechanism is adapted to be used. The reference character 10 designates generally what is termed a flash gun having the switch mechanism 11 associated therewith. At 12 there is shown a camera provided with a shutter (not shown) of any suitable design in an appropriate shutter housing 13. A shutter operating lever 14 extends out of the housing 13 and is linked to the armature 15 of the solenoid 16 at 17. Many similar arrangements are possible. The solenoid 16 is electrically connected with the flash gun 10 by appropriate electrical leads ensheathed in a cable 18. The connectors, plugs, and other constructional details are of no importance to the invention and hence are not illustrated.

Returning to the flash gun 10, same consists of an elongate cannister or housing 19, usually cylindrical in formation which is adapted to contain the resistors, condenser, batteries, and connectors necessary to render the same operative. There is a socket 21 mounted upon the upper end of the housing 19 adapted to receive the flash lamp 22 therein. A reflector 23 is mounted in proper relationship to the lamp 22.

With the exception of the switch mechanism, the elements thus far referred to are conventional and not intended to be considered as a part of this invention in and of themselves. In order to render the understanding of the switch mechanism 11 complete, an electrical diagram of the circuit in which same is used is depicted in Fig. 2 and an explanation thereof will clarify the manner in which the switch mechanism is utilized.

The switch mechanism 11 is shown in Fig. 2 in its quiescent or initial position. The movable arm 30 is free of the lamp contact 31 and the solenoid contact 32. In operation, it will be moved in a counter-clockwise direction about the pivot 33 and serve to distribute the charge from the condenser 34 to the two contacts 31 and 32. The condenser 34 has a high capacitance, usually of the order of 1000 microfarads and same is connected to ground at 35 through a small safety resistor 36 in the lead 37. The opposite side of the condenser 34 is connected to the distributing arm 30 by the wire lead 38 and to the resistor 39 which is in series with the battery 40. The resistor 39 may be 100 ohms and the battery a 22½ volt "B" type used in miniature radios. With such values of resistance, capacitance, and voltage, the time constant will permit the charging of the condenser 34 in almost negligible time. The battery is connected to the terminal 41 of the lamp 22 through the electrical lead 42. The lamp shell 43 is grounded at 44.

The condenser 34 will charge to its full capacity through the filament 45 of the lamp 22 immediately that the lamp 22 is inserted in the socket 21, and after the condenser has been charged to its capacity, current flow will cease. The rate at which the current will flow during the charging period is such that the filament 45 of the lamp 22 will not incandesce and hence the lamp 22 will not be flashed. The rate of current flow is limited by the relatively high resistance 39 in the circuit.

When it is desired to expose the film, the distributing arm 30 is moved in a counter-clockwise direction in a manner which will be explained, and it engages the contacts 31 and 32 in that order. When the contact 31 is engaged as the arm 30 is passing same, a sudden flow of current is caused by the partial discharge of the condenser 34. The path of such flow is as follows: condenser 34, lead 38, arm 30, contact 31, lead 50, lead 42, lamp terminal 41, filament 45, lamp shell 43, ground 44, ground 35, resistor 36, lead 37, back to condenser 34. Since this circuit contains little or no resistance, the flow of current, although only momentary, is sufficient to initiate the flashing of the lamp 22. Same may be filled with aluminum foil, or the like in an atmosphere of oxygen, so that when the filament 45 incandesces and begins the burning of the foil or other medium, the flash will be self-sustaining, as well-known in this type of lamp. The peak of brilliance is reached a short time after the contact 31 has been engaged.

In the meantime, the distributing arm 30 continues on its path and engages the contact 32. Contact 32 is connected by the lead 51 to the solenoid coil 52 and thence to ground at 53. Current will thus flow through the solenoid coil 52 completing the discharge of the condenser 34. The armature 15 will then move to the left, opening the shutter at the proper instant that the brilliance of the flash is at its peak. The elapsed time between the start of the flash of the lamp 22 and the time that the solenoid 15 operates is a direct function of the time required for the arm 30 to move between the contacts 31 and 32. This time is easily adjustable as will be described hereinafter, by reason of the construction of my new switch mechanism.

It is desired at this time to point out that while the reference characters 30, 31, and 32 have thus far designated the distributing arm, lamp contact, and solenoid contact, respectively, they are actually intended to represent assemblies. The small size of Fig. 2 has made it impractical to apply more than one reference character to each of the illustrated elements of the switch mechanism 11 without confusing the illustrations. Hereinafter, the reference characters 30, 31, and 32 will all be general assembly designations and will be described as such.

Referring now to Figs. 3 to 6 inclusive, the switch mechanism 11 is shown therein on an enlarged scale so that the details thereof more readily may be explained. The mechanism 11 is mounted in a hollow housing 60 preferably formed of some molded composition such as a phenolic resin, in order that same be non-conducting. At opposite ends thereof are provided recessed slots 61 for accommodating the heads of the screws 62 by means of which the housing 60 is removably fastened to the side of the cannister 19. The upper end of the housing 60 has a central cylindrical cavity 63 to allow for clearance of the solenoid contact assembly 32. This is connected with an elongate trapezoidal shaped cavity 64 having its wider end uppermost as shown in Fig. 4 and whose purpose is to accommodate the distributing arm assembly 30 and permit its swinging. The connecting cavity 65 in the lowermost part of the housing 60 accommodates the button and linkage therefor as will be described. The housing 60 has an annular protruding boss 66 having a frusto-conical opening 67 leading to the cavity 65, and the switch button 68 extends out of the opening 67 with its outer end substantially flush with the boss 66 so as to prevent accidental depression thereof. A part of the housing designated 69 serves as a stop member for limiting the swinging of the distributing arm assembly 30 in a manner to be explained. Obviously, in the event it is desired to make the housing 60 from metal, other stop means may be provided or the stop means may be insulated from the assembly 30.

The contact assemblies and movable parts of the switch mechanism 11 are all carried upon an elongate insulating block 70 whose contours are such as to engage within the conjoined cavities 63, 64, and 65 of the housing 60 so that when the housing 60 is assembled upon the gun 10 it will cover the said block. The block 70 is secured to the cannister 19 by the countersunk head screws 71 and 72 appropriately screw threaded into the side of the cannister 19. The cannister 19 has five relatively large openings provided therein immediately beneath and covered by the block 70 whose purpose will presently be clarified. Said openings are designated respectively 73, 74, 75, 76, and 80.

At the upper end of the block (as viewed in

Fig. 4) there is mounted the solenoid contact assembly 32. Same consists of a screw threaded stud 77 inserted into the block 70 and having the left hand end thereof provided with a contact head 78 which protrudes from the bottom of the block 70 through the opening 73 and into the cannister 19 where it engages a spring pressed element 79 which connects with lead 51 (see Fig. 2). Obviously, the opening 73 must be of a size sufficiently large to clear the head 78 to prevent electrical engagement between said head 78 and the cannister 19. The right hand end of the stud 77 extends into the cavity 63 and has a pair of nuts 81 and 82 mounted thereon having a flat lug 83 mounted in sandwiched condition therebetween. The lug 83 is pierced to freely move on the stud 77 somewhat like a washer if permitted so to do by the nuts 81 and 82. Obviously, the nuts 81 and 82 serve to enable the lug 83 to be adjusted to any position along the stud 77 and locked thereat. Likewise, the lug 83 may be secured in any offset position desired such as for example as shown in Fig. 3 to permit access to the head of the screw 71 for example, or to move the contact point 84 in case the part engaging the same has become worn or pitted.

The lamp contact assembly 31 comprises a shaft 85 sliding mounted in a pair of ears 86 and 87 and provided with a conical head 88 extending above the ear 86 as shown in Fig. 4, there being an enlarged diameter collar 89 on the opposite side of the ear 86. The shaft is urged in an upward direction as viewed in said Fig. 4 by means of a coiled spring 90 wound about the shaft 85 and extending between the inside of the ears. Due to the collar 89 the upward movement is limited, but downward movement is possible against the bias of the spring 90. The ears 86 and 87 are formed from the sides of a metal standard 91 having an integrally formed base 92 bent at an angle thereto, overlying the block 70 and engaged thereto by the rivets 93 and 94. The rivet 94 is of conventional design and its lower (left hand) swaged end enters the opening 75 so as not to establish electrical engagement with the cannister 19, while the same end of the rivet 93 has a contact head 95 which clears the sides of the opening 74 and engages the spring pressed element 96 which connects with the lead 50 (see Fig. 2).

The distributing arm assembly 30 comprises a pair of elongate tapered arms 100 held in spaced apart condition by the spacer 101 secured between the arms intermediate the ends thereof and by the cylindrical spacer-contact bar 102 secured between the upper ends of the arms 100. The spacer-contact bar 102 serves both as a spacer and contact and hence is formed of a suitable contact metal not readily pitted. It will be referred to hereinafter as a contact bar since that is its principal function. The ends of the arms 100 opposite to those mounting the contact bar 102 are provided with short pins 33 about whose axis the arms 100 are adapted to pivot. It will be noted that the arms 100 are spaced apart sufficiently to completely clear the contact assembly 31, except for the conical contact end 88 which will be touched by the contact bar 102 as the arms 100 swing from the position shown in solid lines in Fig. 4 to the broken line position in said figure.

The pivot pins 33 are mounted at the inner rounded ends of the slots 104 formed in the spaced apart uprights 105 of the channel member 106 whose base 107 is attached to the block 70 by the rivets 108 and 109. The rivet 109 is of conventional construction and its swaged left hand end enters the opening 80, while the rivet 108 is formed in the same manner as the rivet 93, being provided with an enlarged contact head 110 which enters the cannister 19 through the opening 76 to electrically engage with the spring element 111. Said element 111 is connected with the lead 38 (see Fig. 2).

The lower end of the button 68 is disposed between the uprights 105 and is of reduced diameter to clear the same, as shown at 113. The button end 113 is bifurcated and straddles a toggle link 114 to which it is pinned at 115. One end of the toggle link 114 is pivotally mounted on a pin 116 which extends between the uprights 105 and the opposite end is secured at 117 to a coiled spring 118 which is connected to the center of the spacer 101 in the groove 119. The bifurcated button end 113 is urged to the right as viewed in Fig. 4 by means of a pair of coiled springs 120 each mounted on the pin 116 between the inside of the uprights 105 and the end of the toggle link 114, said springs 120 each having an end engaged in the base 107 at 121 and another end 122 engaging in the bifurcation of the button end 113 under the pivot pin 115. This is best shown in Fig. 4. It will be seen by reference to Fig. 3 that the springs 120 also serve to center the toggle link 114 upon the pivot pin 116. The base 107 has an opening 125 to permit access to the screw 72. For this purpose, the entire distributing arm assembly 30 may slide out of the slots 104 and with the button 68 and its linkage swing about the pin 116. Of course the housing 60 must first be removed.

It is of importance that the line between the axis of the spacer 101 and the point 117 be to the right of the axis of the pivot pins 33 as viewed in Fig. 4 when the switch assembly 11 is poised for operation. In this condition, irrespective of the forces exerted by the springs 120, there will be a component of force at right angles to the line between the axis of the pivot pins 33 and the axis of the spacer 101 tending to swing the arms 100 to the right, or clockwise about the pivot pins 33 as viewed in Fig. 4. Thus the contact bar 102 will remain engaged against the stop 69. When the button 68 is depressed against the force of springs 120, the link 114 will swing to the left or counter-clockwise about the pivot pin 116 moving the end 117 to the left. The spring 118 now begins to stretch, but the arms 100 will not move until the line between points 117 and axis of spacer 101 just crosses to the left of the pivot axis 33. At this instant, a component of force is created at the axis of spacer 101 which tends to pull the arms 100 to the left, or counter-clockwise about the pivots 33. The greater the movement to the left, the greater proportion of the potential energy in the stretched spring 118 will be acquired by this force. The result is a self-sustaining movement of the arms 100 to the broken line position of Fig. 4 which is at a speed practically independent of the speed at which a person could press down on the button 68. This can be termed a snap action. The release of the button 68 will enable the springs 120 to force the return of the arms 100. Without these springs 120, the arms 100 would remain in the broken line position.

Since, as explained, the delay between the beginning of the flash and the actuation of the solenoid 16 depends upon the time required between distribution of charge to the respective circuits involved, it will be seen that when the bar 102 is against the stop 69 in quiescent condition, the condenser 34 will charge through the lamp filament 45. When the button 68 is pressed and the bar 102 executes its stroke, the charge on the condenser 34 is partially lost to the lamp 22 as the bar 102 engages, depresses, and passes the conical contact 88. The current flows from the contact 88 to contact 95 in an obvious manner. The bar 102 continues its movement and finally comes to rest on the contact point 84 where the remainder of the charge is lost to the solenoid 16 through the contact 78. The delay between circuit energization is measured by the time it takes for the bar 102 to move from contact 88 to contact point 84, and this time is readily adjustable merely by changing the position of the lug 83 along the stud 77.

It is desired to point out that while my switch mechanism is most ideally suited for the use in connection with which the specification has described the same, namely in flash photography, it is likewise suitable for use in many fields where two or more consecutive electrical engagements are required to be made with a predetermined delay therebetween. The invention is likewise not limited by the illustrated arrangement of parts, dimensions, and the like, but is intended to have a breadth commensurate with the scope of the appended claims.

I claim:

1. In a switch of the character described, a bifurcated, pivoted arm having a spacer bar on the free end thereof, means providing momentary electrical contact as the arm passes comprising an elongate member arranged to enter the bifurcation as the arm moves past the same, having a rounded tip in path of the bar, adapted to be electrically engaged and pushed aside by said bar as same passes, and spring means opposing the movement of said tip.

2. In apparatus of the character described, a switch comprising a swingable arm having a pivot and a contact bar on the respective ends thereof, a stop, a snap-action mechanism operably connected with said arm including a lever pivotally mounted spaced from said pivot and spring means connected between the lever and the arm adapted to move the lever to opposite sides of the pivot and bias said arm against the stop, a pair of spaced apart contacts, and manual means for overcoming the bias and causing the snap-action mechanism to move the arm past the first contact and into engagement with the second contact, said first contact including a moveable member disposed between said pivot and bar and having a retractile tip mounted in the path of said bar electrically engaging therewith as said arm is passing.

3. A switch mechanism for flash camera apparatus having a flash lamp circuit, a shutter solenoid circuit, a condenser charging circuit and a charged condenser for energizing both the lamp and shutter solenoid circuits, comprising a pair of spaced apart contacts respectively connected to the lamp and solenoid circuits, an elongate pivotal member having a charge distributing contact bar on the upper end thereof, and means for pivoting said member at a uniform rate of speed whereby to cause said bar to engage the lamp and solenoid contacts consecutively for distributing a portion of the charge from said condenser to said lamp and solenoid circuits, the first of said contacts being retractile so as to permit the bar to pass same after engagement therewith to engage the second contact, said member having its pivot at the opposite end thereof, said means including a pivotally mounted lever spaced from the pivot, a spring member having one end thereof connected to the center of the said member and its other end connected to said lever, said spring biasing said member in a direction away from the contacts, and a manually operable push rod adapted to engage said lever for moving the member past said pivot and spring means connected to the lever for returning said member to the opposite side of the pivot.

4. A switch mechanism for flash camera apparatus having a flash lamp circuit, a shutter solenoid circuit, a condenser charging circuit and a charged condenser for energizing both the lamp and shutter solenoid circuits, comprising a pair of spaced apart contacts respectively connected to the lamp and solenoid circuits, an elongate pivotal member having a charge distributing contact bar on the upper end thereof, and means for pivoting said member at a uniform rate of speed whereby to cause said bar to engage the lamp and solenoid contacts consecutively for distributing a portion of the charge from said condenser to said lamp and solenoid circuits, the first of said contacts being retractile so as to permit the bar to pass same after engagement therewith to engage the second contact, said member having its pivot at the opposite end thereof, said means including a pivotally mounted lever spaced from the pivot, a spring member having one end thereof connected to the center of the said member and its other end connected to said lever, said spring biasing said member in a direction away from the contacts, and a manually operable push rod adapted to engage said lever for moving the member past said pivot and spring means connected to the lever for returning said member to the opposite side of the pivot, said member comprising a pair of spaced apart arms having said contact bar connected between the upper ends of the arms and having a spacer member intermediate the ends of the arms to which said one end of the spring member is secured.

MICHAEL L. GARDNER.

REFERENCES CITED

The following references are of record in the file of this patent:

UNITED STATES PATENTS

| Number | Name | Date |
|---|---|---|
| 1,232,050 | Kraemer | July 3, 1917 |
| 1,866,422 | Ralph | July 5, 1932 |
| 1,968,597 | Blake | July 31, 1934 |
| 1,986,513 | Mendelsohn | Jan. 1, 1935 |
| 2,218,950 | Frank | Oct. 22, 1940 |
| 2,439,417 | Castedello | Apr. 13, 1948 |
| 2,553,662 | Marsal | May 22, 1951 |